June 13, 1961 W. B. ROSENFIELD 2,988,633
FLUORESCENT CEILING LIGHT FIXTURE ASSEMBLY
Filed Sept. 11, 1958 5 Sheets-Sheet 1
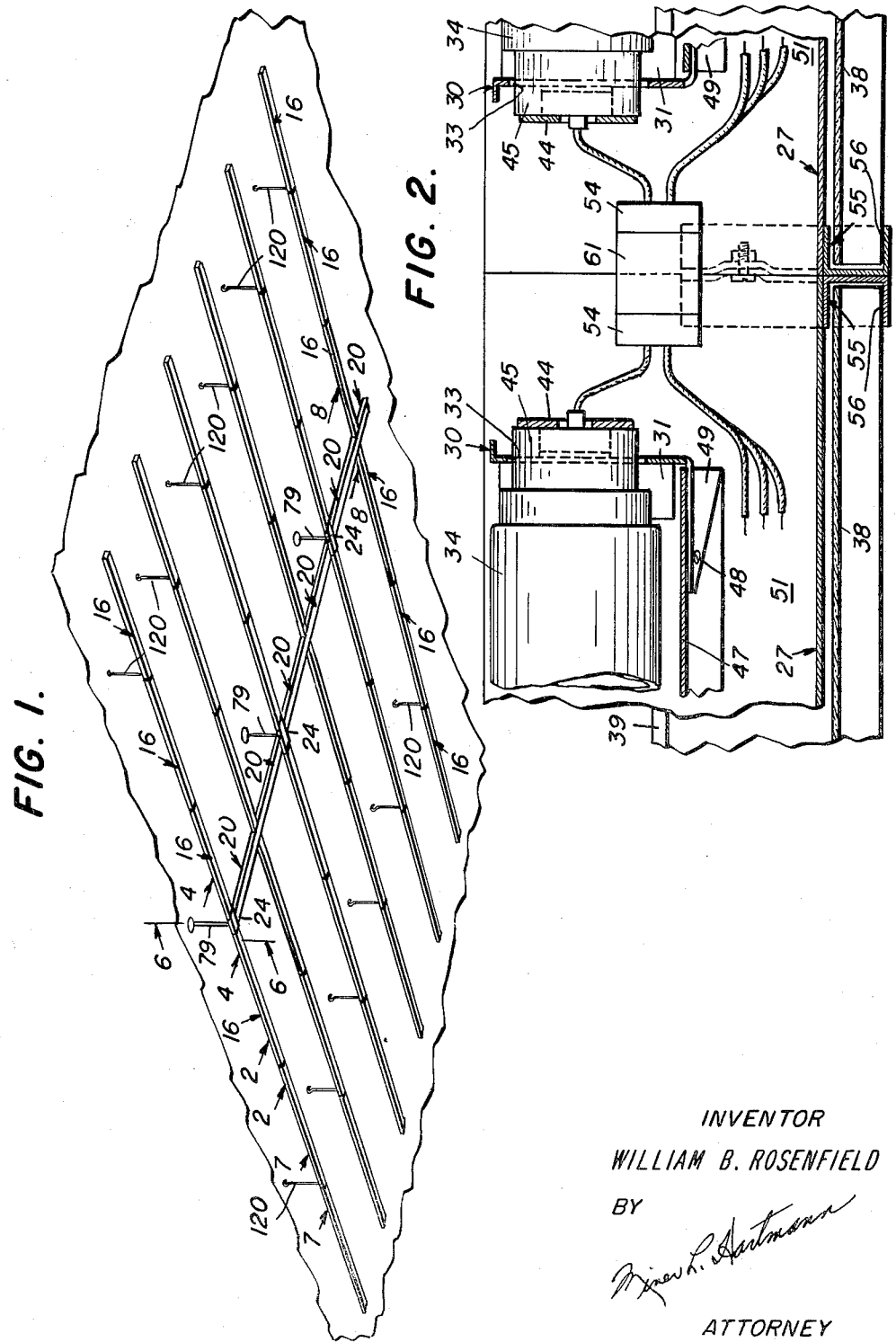
INVENTOR
WILLIAM B. ROSENFIELD
BY
ATTORNEY

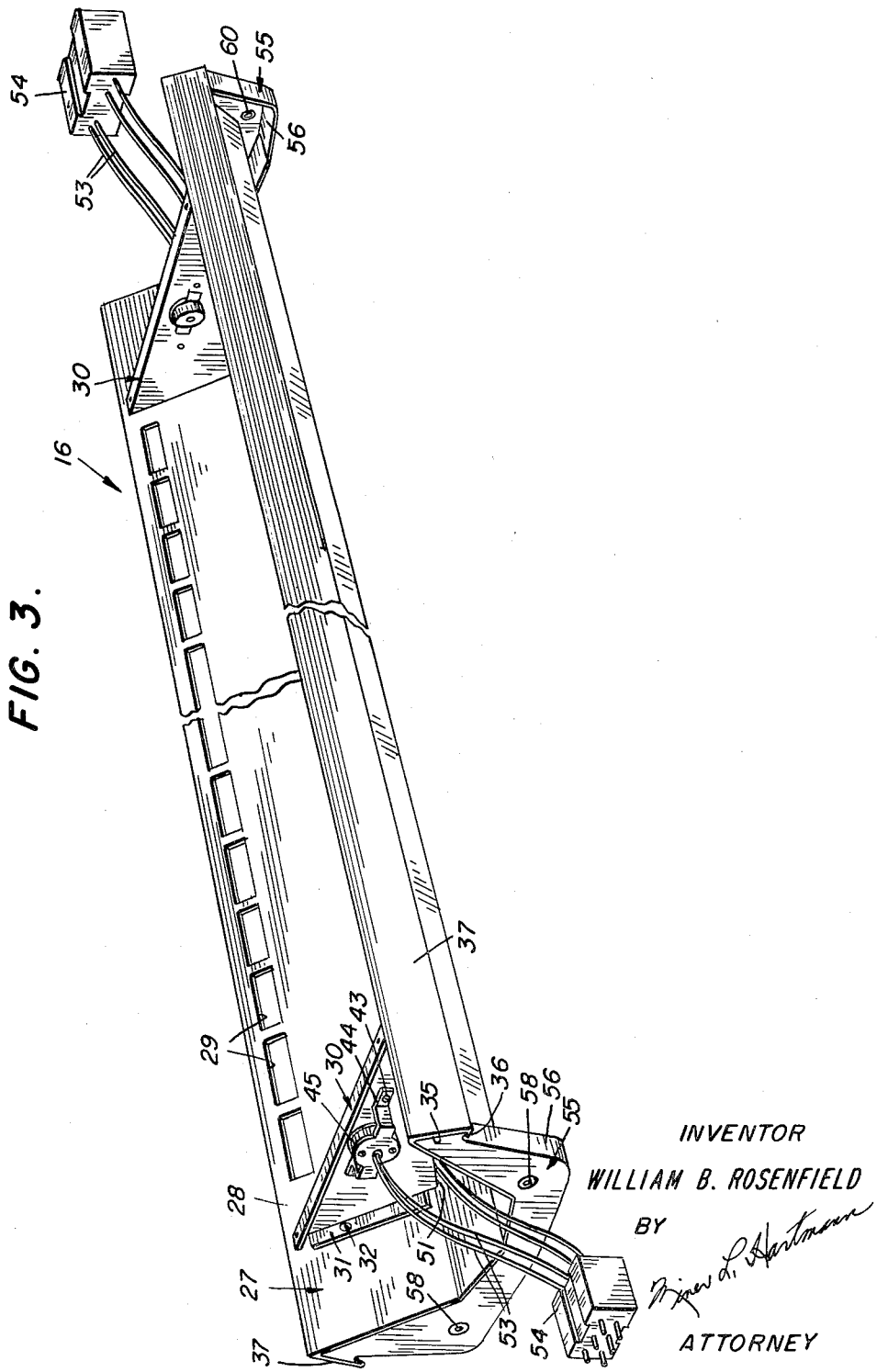

June 13, 1961 W. B. ROSENFIELD 2,988,633
FLUORESCENT CEILING LIGHT FIXTURE ASSEMBLY
Filed Sept. 11, 1958 5 Sheets-Sheet 3

INVENTOR
WILLIAM B. ROSENFIELD
BY

ATTORNEY

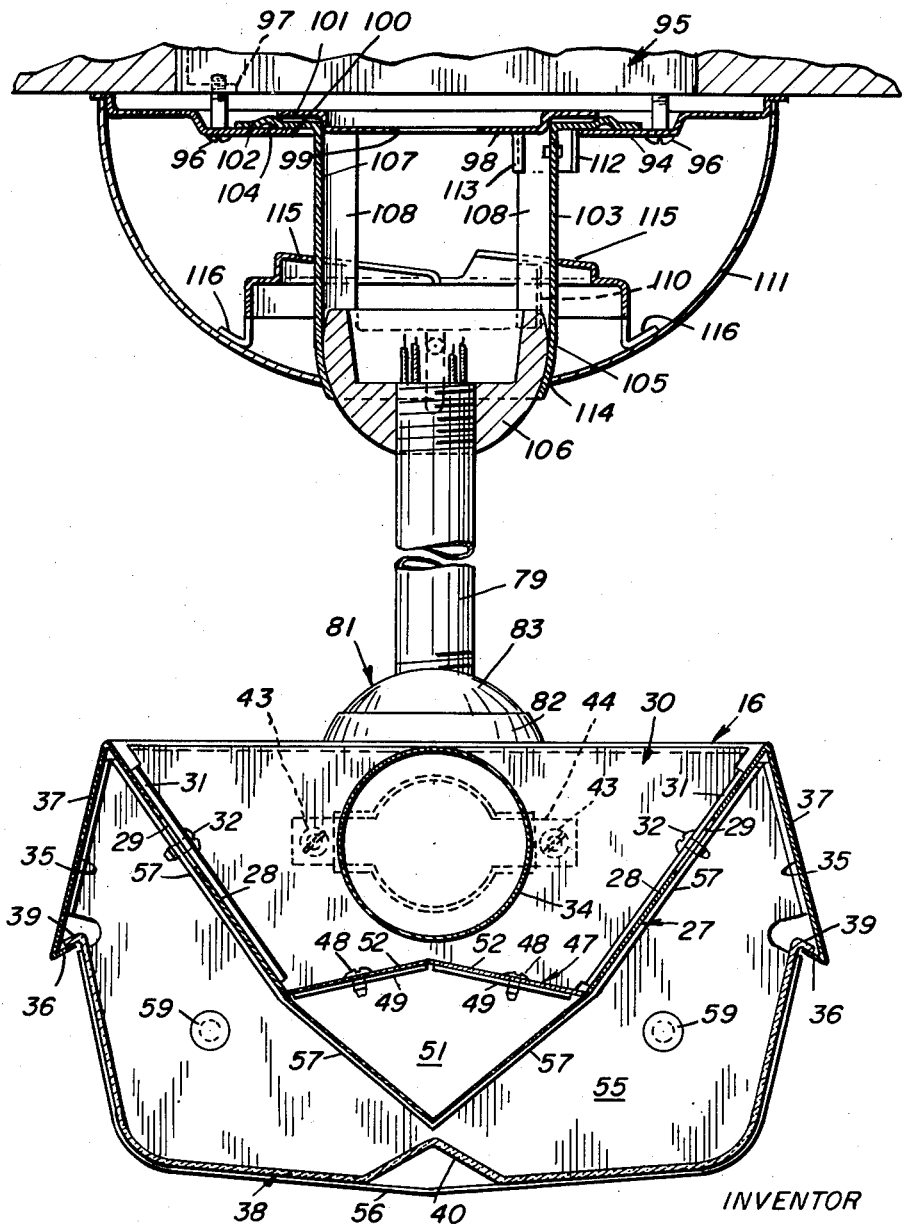

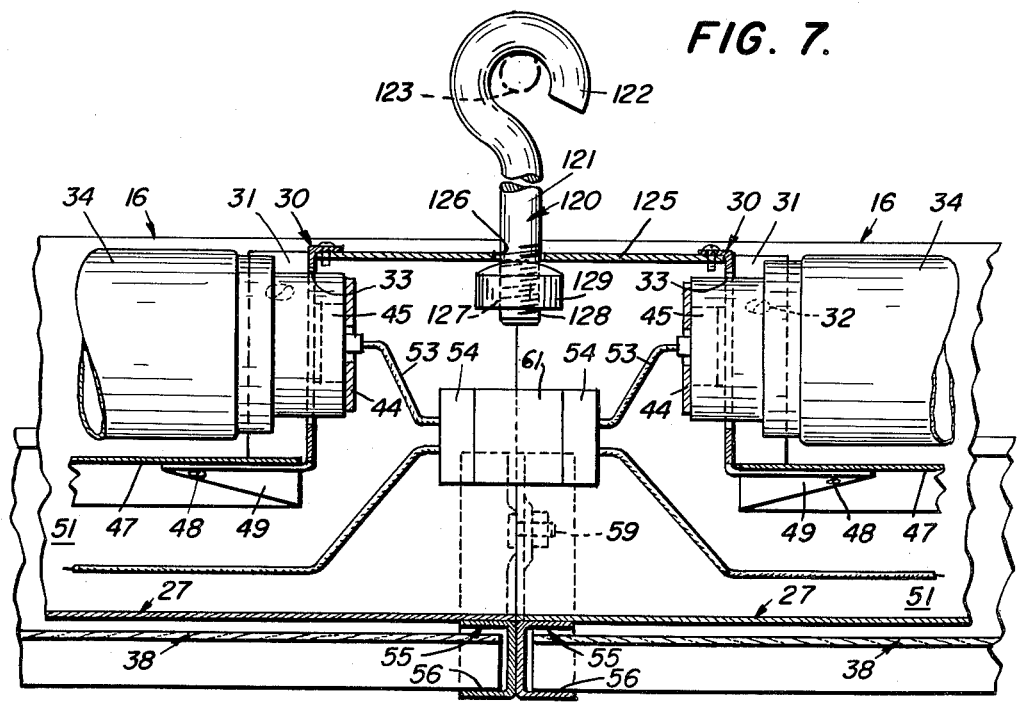
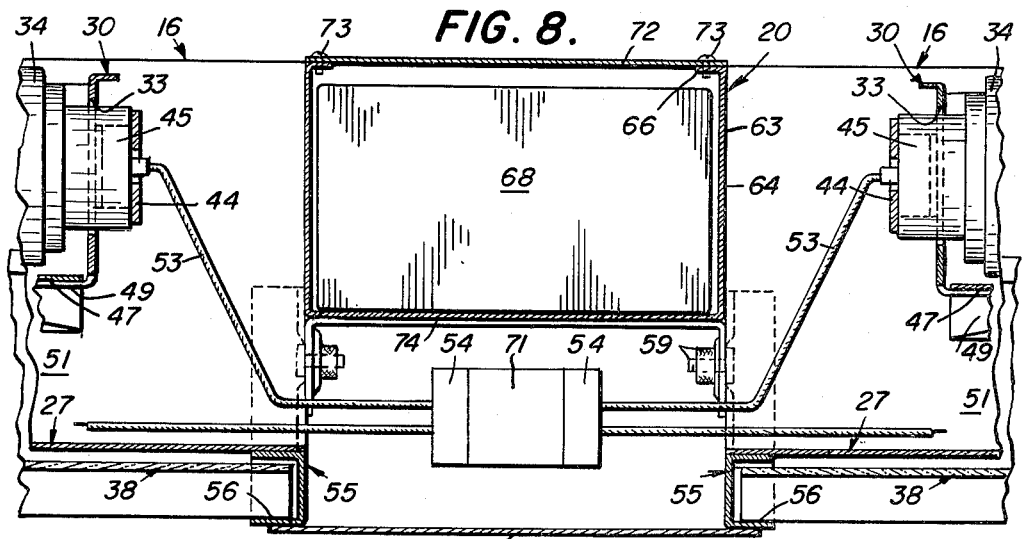

United States Patent Office 2,988,633
Patented June 13, 1961

2,988,633
FLUORESCENT CEILING LIGHT FIXTURE
ASSEMBLY
William B. Rosenfield, Sepulveda, Calif., assignor to Sunbeam Lighting Company, Los Angeles, Calif., a firm
Filed Sept. 11, 1958, Ser. No. 760,444
6 Claims. (Cl. 240—9)

This invention relates to multiple fluorescent light fixtures for ceiling lighting, and in particular to an assembly of a plurality of linear light runs spaced apart by unlighted cross members containing electrical ballast units.

One object of the invention is to provide means for the simple mechanical and electrical installation and connection of fluorescent lamp housings, ballast housings, units and suspension support units for a patterned tubular fluorescent light fixture assembly arranged for suspension from a ceiling. Another object is to provide a suspension support unit for a patterned tubular fluorescent light fixture assembly which includes easily connected and disconnected pin and socket block means for electrically connecting fluorescent lamp housing units and ballast housing units at the time of mounting or dismounting said units in place on a ceiling. A further object is to provide fully wired separate light housing units, suspension units, and ballast units for electrically connecting the units coincident to mechanical assembly and installation on the ceiling, thereby facilitating shipping of fully wired units in compact disassembled condition, as well as facilitating installation of the assembly, piece by piece, on the ceiling, using minimum time for skilled installation labor.

These and other objects are attained by my invention which will be understood from the following description, reference being made to the accompanying drawings in which:

FIG. 1 is a schematic representation of a patterned fluorescent light fixture assembly as mounted on a ceiling;

FIG. 2 is a cross-sectional view taken on the line 2—2 of FIG. 1;

FIG. 3 is a perspective view of a typical fluorescent tube housing unit;

FIG. 6 is a cross-sectional view taken on the line 6—6 of FIG. 1;

FIG. 7 is a cross-sectional view taken on the line 7—7 of FIG. 1; and

FIG. 8 is a cross-sectional view taken on the line 8—8 of FIG. 1.

Figure 4:
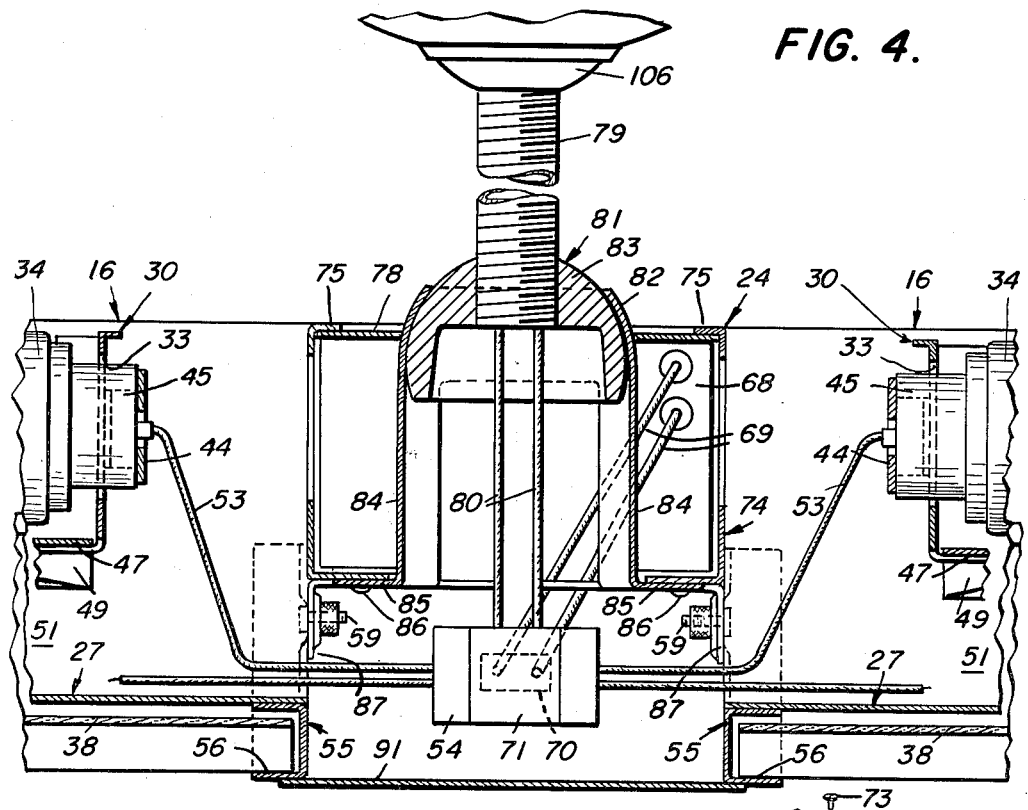
FIG. 4 is a cross-sectional view taken on the line 4—4 of FIG. 1.

Referring particularly to FIG. 1, this shows one of many patterned arrangements of units which may be assembled from the units herein described. The particular one shown consists of a cross line of three double length ballast housing units which connect six long lines of lighting members consisting of six fluorescent tube housing units, of which half extend in one direction from the ballast housing line, and the other half extend in the opposite direction. It will be clear that other arrangements of the several units may be made to form varied patterned assemblies on the ceiling, depending upon the size of the room and the lighting requirements.

The fluorescent tube housing units 16 are generally of long trough-like structures having end plates which may to be joined to the end plates of other light units or to the suspension support unit sides, as will be described. As shown, the particular tube housing units consist of reflecting type fixtures, as set forth in detail in Bodian and Rosenfield patent application Ser. No. 720,100, filed March 10, 1958. The housing consists generally of a V-shaped channel 27 directed toward the ceiling, the side channel walls 28, in their upper portions being provided with a plurality of window slots 29 through which a relatively small proportion of the light generated by the elongated fluorescent lamps 34 is reflected into the diffuser space to illuminate the diffuser 38. The light going through the window slots 29 is reflected from the reflecting surface 35 of the turned-down margins of the side walls of the V-shaped lamp channel 27, the margins 37 being disposed at a selected small angle from the vertical to reflect the light which comes through the window slots 29 into the diffuser trough 38, either directly or by a second reflection from the outer wall surface of the side walls 28, depending upon the position of the window slots and the angular disposition of the reflecting surfaces. The diffuser 38 consists of a translucent formed synthetic plastic material trough whose edge margins 39 are turned down slightly to engage the inclined, inturned hook flanges 36 of the turned-down margins 37 of the channel walls. The diffuser 38 is provided with an inwardly turned bottom rib 40 which serves to stiffen the structure in the longitudinal direction. The trough 38 is rigid but may be distorted laterally by hand pressure to insert or withdraw its margins 39 from the inturned hook flanges 36 of the turned-down margins 37. Socket mounting members 30 of generally triangular shape are attached near the ends of the tube channels, said members 30 having turned margins 31 for attachment to the adjacent sides of the lamp channel 27, by means of screws 32. Each socket mounting member 30 is provided with a hole 33 arranged to receive the ends of the lamp sockets 45, the sockets being attached by means of brackets 44 held to the mounting members 30 by screws 43. The lower portion of the V-shaped lamp channel 27 is partitioned off horizontally by a longitudinally ridged cover 47 removably attached by screws 48 to the tabs 49 on the socket mounting members 30 to form an enclosed wire channel 51. The cover 47 is longitudinally ridged so that downwardly directed light from the adjacent lamp tube 34 will be reflected angularly from both angularly-disposed surfaces 52, and thus be added to the main light emission directed toward the ceiling. The electrical terminals of the lamp sockets 45 are connected by flexible conduits 53 to pin plug connectors 54.

As shown in FIG. 2, the adjoining ends of abutting fluorescent tube housing units are connected together by means of end plates 55 which have inturned lower marginal flanges 56 which serve to enclose the ends of the diffuser trough 38. Inturned flanges 57 on the upper edges of the end plates 55 provide means for holding the end plates to the V-shaped channel 27, as by welding. Holes 58 are provided in the end plates 55 to receive connecting bolts 59 for holding the light to the tabs 87 of the suspension channel member 74. Similar bolt holes 60 are provided at the opposite end plates for connecting the adjoining end plate of another light unit. The pin block connectors 54 of adjoining lamp units are interconnected to the wiring in the wire channel 51 by means of an adapter 61.

The ballast units 20 consist generally of a structural channel 63 having upturned sides 64 with inturned flanges 66 defining its upper surface. A channel-fitting sheet metal coupler 67 is provided in each end of the structural channel 63, being attached thereto by spot welding, these couplers being arranged to telescope into the open ends of the suspension support unit 24, as further described below. Electric ballast elements 68 are supported inside the structural channel 63, the electrical connections of said ballast elements being attached to flexible conduit 69 terminating in a pin plug connector 70, which is arranged for suitable connection to a pin block connector 71. A cover 72 for the ballast unit is attached to the flanges 66 by screws 73.

At intermediate positions lengthwise of the ballast units 20, there are provided attachment tabs 131 having holes 132 positioned to coincide with holes 60 in the end plates 55 of the light housing units 16. Flexible lead wires 133 connected to plug connectors 134 are electrically attached to the ballast members 68. A snap-on cover 136 is provided to close the joint and enclose the plug connectors.

Figure 5:
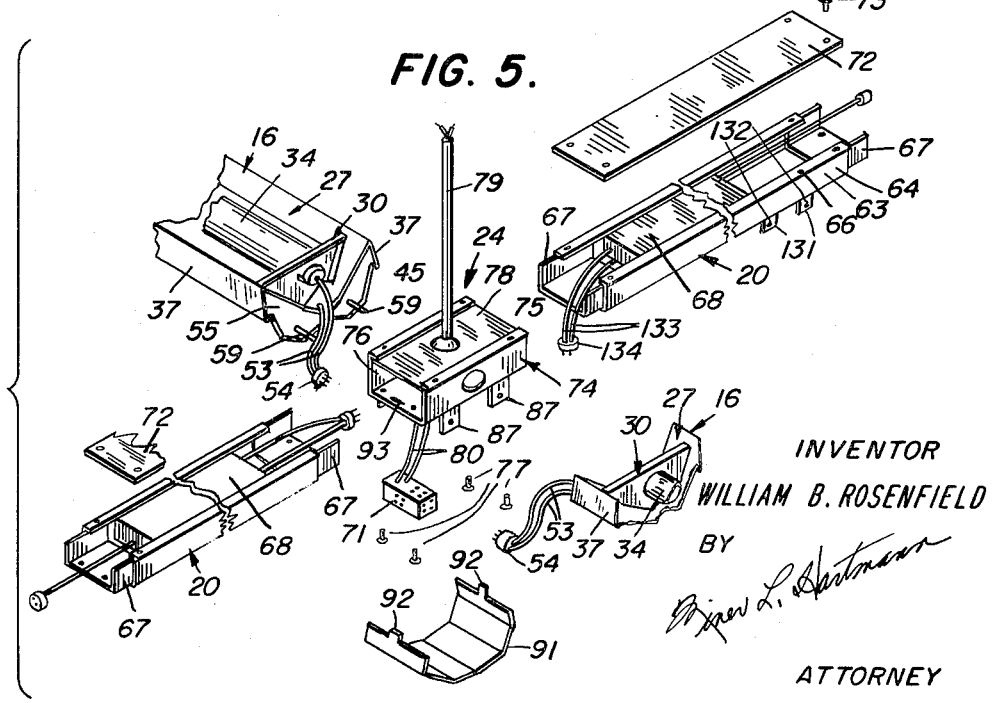
FIG. 5 is a perspective view in disassembly of two fluorescent light units, two ballast housing units, and a ball-socket suspension support unit.

The suspension support unit 24 consists of an open ended box-like structure adapted to interconnect two fluorescent tube housing units, and two ballast housing units, and also to support them from the ceiling, as shown particularly in FIG. 5. The box-like structure consists of a short channel member 74, having inturned flanges 75, the open ends 76 being arranged to receive in telescopic relation the coupler members 67 of the ballast housing units 20. Screws 77 are provided to secure the couplers to the bottom of the structural channel 74. A closure plate 78 is provided for the suspension unit, being held under the inturned flanges 75, this closure plate being connected by swivel means to a hollow support tube 79 which is attached to the ceiling, electrical supply leads 80 being lead into the suspension unit 24 through said hollow support tube. The swivel means consists of a ball-socket joint 81 in which a U-shaped cage 82 encloses a spherical member 83, to which is attached the lower end of the support tube 79. The legs 84 of the cage 82 are provided with outturned feet 85 which are attached by screws 86 to the bottom inside face of the channel member 74. The electric supply leads 80 pass through the support tube 79 and the hollow spherical member 83 and are operatively connected to the plug block 71 depending by the leads 80 from the under side of the suspension unit 24.

The support channel member 74 is provided on its sides with depending tabs 87, having holes for connecting bolts 59 which engage the end plates 55 of a fluorescent tube housing unit 16. A snap-on cover 91 with tabs 92 is adapted to engage the slots 93 in the lower face of the channel member 74 to form a cavity to contain the plug block 71 and attached connectors when the electrical connections to the ballast elements and to the light units have been connected thereto.

The support tube 79 is mechanically and electrically attached to ceiling outlet boxes. The mechanical attachment is preferably a ball and socket type connection which permits some freedom for the entire assembly to swing. I prefer to use a swivel connection described in detail in Bodian co-pending patent application, Serial No. 634,038, filed January 14, 1957, now Patent No. 2,851,588, issued September 9, 1958, in which the upper end of the support tube 79 is threadedly attached to the ball 106 which is angularly movable in a cage or socket 105 which is removably attached to a base plate 94, as shown in FIG. 6.

The base plate 94 for the swivel connection is adapted to be supported on an electric wiring outlet box 95 by means of screws 96 in the threaded ears 97 which are generally provided on the open face of the outlet box. The base plate 94 is provided with a central raised boss 98 having an opening 99 for electrical conduits and diametrically opposed raised tab pockets 100 with adjoining openings 101 disposed away from the central circular raised boss 98, the pockets 100 being adapted to receive outturned tabs 102 on the socket frame 103. A wedge tab 104 extends into each of the pockets 100 from the inner edge of the base plate pocket, for the safety locking of the outturned tabs 102, as will be described.

The socket frame 103 consists of a generally cylindrical body, one end of which is drawn in to form a part-spherical socket 105 which is adapted to hold a ball 106. Upper portions of the cylindrical body 107 are cut away in opposite segments to leave opposed legs 108 extending from the upper rim of the socket 105. The legs 108 are curved in cross-section and disposed apart to fit around the raised boss 98 on the base plate 94; and each leg at its end is provided with an outturned tab 102 which is adapted to engage the tab pocket 100 of the base plate. The circular raised boss 98 serves as an abutment for the legs and as a guide in turning the tabs into the pockets. A raised abutting boss is provided on the outer face of each of the tabs 104, these bosses being adapted to engage wedge tabs 104 extending into the tab pockets 100 from the base plate 94 adjacent the inner edge of the tab pockets 100. Each leg 108 is also provided, at positions intermediate the outturned tabs 104 and the socket, with radial tabs 110 which are adapted to coact with parts of the canopy, as later described.

On the outer surface of each of the legs 108 adjacent the outturned tabs 102 there is provided a spring detent clip 112 which is arranged to releasably engage the notches in the edge of the tab pockets 100 contiguous to the boss 98 on the base plate. The socket frame 103 is removably attached to the base plate 94 by rotating the frame around the boss 98 so that the outturned tabs 102 enter the tab pockets 100 to the bottom of the pockets, at which position the spring detents 112 engage the notches 113 and simultaneously the wedge tabs 104 press against the abutting bosses on the outturned tabs, thus securely locking the socket frame 103 to the base plate 94 so that it cannot be loosened by vibration or by a laterally applied force. The socket frame 103 may, by reversing the rotation and simultaneously releasing the spring detents 112 by grasping them with the fingers, be removed without the employment of any tools.

The canopy 111 consists of a hollow metal stamping having a central opening 114 adapted to fit around the lower end of the socket 105. Inside the canopy there is provided a pair of diametrically opposed helical tracks 115 formed from sheet metal on a cylindrical body having attachment tabs 116 which are spot-welded to the inside surface of the canopy. The helical tracks 115 are adapted to engage radial tabs 110 on the legs 108 of the socket frame 103, as previously described. When the canopy is rotated with the helical tracks 115 engaging the radial tabs 110, the rim of the canopy is raised to tightly press against the outer rim of the base plate 94 (or against the ceiling surface), and thus conceals all of the hanger device except the pendant stem 79 and the lower portion of the ball 106.

Auxiliary hangers 120 consisting of a rod 121 having a hook 122 on its upper end is adapted to engage the eyelet bolt 123 attached to the structural members of the ceiling. The end 127 of the rod 121 opposite the hook 122 has threads 128 which are provided for the nut 129. An attachment plate 125 having a hole 126 to receive the one end 127 is attached to the socket mounting members 30 of the adjoining lamp housing units 16 by the bolts 59 which holds the units together.

The advantages of my invention will be obvious from the above description. The assembly of units is made piece-by-piece from the previously wired light housing units and ballast housing units. In general, the suspension support units are first operatively mounted to the ceiling where outlet boxes are provided, and the electrical connections from the outlet boxes are made to the leads in the support tube. The other units are then attached to the support units, and the electrical connections being made by the connectors at each end of the several units. The terminal light units have cantilever support from the auxiliary hangers 120.

While I have described one particular pattern for the light fixture assembly, it will be clear that many modifications of this pattern may be assembled from the units in an analogous manner.

The objectives previously set forth are accomplished by my invention is described.

I claim:

1. A patterned tubular fluorescent light fixture assembly for suspension mounting below a ceiling comprising in combination pluralities of upwardly facing trough-like fluorescent tube housing units, ballast housing units containing ballast members, and suspension support units, including rod members attachable to the ceiling, said units being interconnected electrically and mechanically to form long parallel rows of lightable fluorescent tube housing units and transverse unlightable rows of ballast housing units, the adjoining ends of certain of said fluorescent tube housing units disposed adjacent the ends of said ballast units being connected mechanically by separable connecting means and electrically by separable electrical connector means to said suspension support units, and the ends of certain other fluorescent tube housing units disposed adjacent the middle portion of said ballast units being connected mechanically by separable connecting means and electrically by separable electrical connector means to said middle portion of said ballast units; and the ends of said ballast housing units being connected mechanically by separable connecting means and electrically by separable electrical connector means to said suspension support units; the other ends of said adjacent fluorescent tube housing units being connected electrically by separable electrical connector means and mechanically by separable connecting means in end-to-end relation to other fluorescent tube housing units forming said long parallel rows of lightable housings; and hanger rods attached to the adjoined ends of said other tube housings for attachment to the ceiling.

2. A patterned tubular fluorescent light fixture assembly for suspension mounting below a ceiling comprising, in combination, pluralities of upwardly facing trough-like fluorescent tube housing units, ballast housing units, and suspension support units, said units being interconnected electrically and mechanically to form long parallel rows of lightable fluorescent tube housing units and transverse unlightable rows of ballast housing units, the adjoining ends of certain of said fluorescent tube housing units disposed adjacent said ballast units being separably connected mechanically and electrically to said suspension support units; and the ends of said ballast housing units being separably connected mechanically and electrically to said suspension support units; each of said suspension support units comprising a support channel having inturned flanges, the open ends of said channel being disposed to face the ends of said ballast housing units and to form a sleeve joint therewith, with a closure plate disposed under said inturned flanges, said closure plate being operatively attached to a hollow support tube adapted to be suspended from the ceiling and to conceal electric supply wires; said support channel being provided at the sides with screw tabs arranged to engage the ends of adjoining fluorescent tube housing units for connection thereto; an electrical connector block electrically connected to electric supply wires carried to said support channel by said hollow tube, said connector block being adapted to receive pin connector plugs from said lamp housing units and said ballast housing units; and a separable snap-on cover member arranged below said channel member and adapted to conceal said connector block and said pin connectors.

3. A patterned tubular fluorescent light fixture assembly for suspension mounting below a ceiling comprising, in combination, pluralities of upwardly facing trough-like fluorescent tube housing units, ballast housing units, and suspension support units, said units being interconnected electrically and mechanically to form long parallel rows of lightable fluorescent tube housing units and transverse unlightable rows of ballast housing units, the adjoining ends of certain of said fluorescent tube housing units disposed adjacent said ballast units being separably connected mechanically and electrically to said suspension support units; and the ends of said ballast housing units being separably connected mechanically and electrically to said suspension support units; each of said suspension support units comprises a support channel having inturned flanges, the open ends of said channel being disposed to face the ends of said ballast housing units and to form a sleeve joint therewith, with a closure plate disposed under said inturned flanges, said closure plate being operatively attached to a hollow support tube adapted to be suspended from the ceiling and to conceal electric supply wires; said support channel being provided at the sides with screw tabs arranged to engage the ends of adjoining fluorescent tube housing units for connection thereto; an electrical connector block electrically connected to electric supply wires carried to said support channel by said hollow tube, said connector block being adapted to receive pin connector plugs from said lamp housing units and said ballast housing units; and a separable snap-on cover member arranged below said channel member and adapted to conceal said connector block and said pin connectors; and each of said ballast housing units comprising a structural channel having inturned flanges defining its upper surface, a sheet metal channel coupler extending from the ends of said structural channel, said coupler being adapted to telescope into the open ends of said suspension support unit, an electrical ballast member mounted within said structural channel, and pin electrical connectors with wire leads electrically connected to said ballast member.

4. A patterned tubular fluorescent light fixture assembly for suspension mounting below a ceiling comprising, in combination, pluralities of upwardly facing trough-like fluorescent tube housing units, ballast housing units, and suspension support units, said units being interconnected electrically and mechanically to form long parallel rows of lightable fluorescent tube housing units and transverse unlightable rows of ballast housing units, the adjoining ends of certain of said fluorescent tube housing units disposed adjacent said ballast units being separably connected mechanically and electrically to said suspension support units; and the ends of said ballast housing units being separably connected mechanically and electrically to said suspension support units; each of said suspension support units comprising a support channel having inturned flanges, the open ends of said channel being disposed to face the ends of said ballast housing units and to form a sleeve joint therewith, with a closure plate disposed under said inturned flanges, said closure plate being operatively attached to a hollow support tube adapted to be suspended from the ceiling and to conceal electric supply wires; said support channel being provided at the sides with screw tabs arranged to engage the ends of adjoining fluorescent tube housing units for connection thereto; an electrical connector block electrically connected to electric supply wires carried to said support channel by said hollow tube, said connector block being adapted to receive pin connector plugs from said lamp housing units and said ballast housing units; and a separable snap-on cover member arranged below said channel member and adapted to conceal said connector block and said pin connectors; each of said ballast housing units comprising a structural channel having inturned flanges defining its upper surface, a sheet metal channel coupler extending from the ends of said structural channel, said coupler being adapted to telescope into the open ends of said suspension support unit, an electrical ballast member mounted within said structural channel, and pin electrical connectors with wire leads electrically connected to said ballast member; and each of said fluorescent tube units comprising a trough-like structure partly surrounding tubular lights, with end plates at the ends of said troughs, said plates being provided with sockets for mounting the tubular fluorescent lamps, and electrical leads from said sockets connected by flexible wires to pin electrical connectors.

5. A patterned tubular fluorescent light fixture assembly for ceiling mounting comprising in combination pluralities of fluorescent tube housing units, ballast housing units, and suspension support units, said units being interconnected electrically and mechanically to form long parallel rows of lightable fluorescent tube housing units and intermediate unlightable cross rows of ballast housing units, the adjoining ends of certain of said fluorescent tube housing units disposed adjacent the ends of said ballast units being separably connected mechanically and electrically to said suspension support units; and the ends of said ballast housing units being separably connected mechanically and electrically to said suspension support units; the other ends of said adjacent fluorescent tube housing units being separably connected electrically and mechanically in end-to-end relation to other fluorescent tube housing units forming said long parallel rows of lightable housings; and hanger rods attached to the adjoined ends of said other tube housings for attachment to the ceiling; each of said suspension support units comprising a support channel having inturned flanges, the open ends of said channel being disposed to face the ends of said ballast housing units and to form a sleeve joint therewith, with a closure plate disposed under said inturned flanges, said closure plate being operatively attached to a hollow support tube adapted to be suspended from the ceiling and to conceal electric supply wires; said support channel being provided at the sides with screw tabs arranged to engage the ends of adjoining fluorescent tube housing units for connection thereto, an electrical connector block electrically connected to electric supply wires carried to said support channel member by said hollow tube, said connector block being adapted to receive pin connector plugs from said lamp housing units and said ballast housing units; and a separable snap-on cover member arranged below said channel member and adapted to conceal said connector block and said pin connectors; each of said ballast housing units comprising a structural channel having inturned flanges defining its upper surface, a sheet metal channel coupler extending from the ends of said structural channel, said coupler being adapted to telescope into the open ends of said suspension support unit, an electrical ballast member mounted within said structural channel, and pin electrical connectors with wire leads electrically connected to said ballast member; and each of said fluorescent tube units comprising a trough-like structure partly surrounding tubular lights, with end plates at the ends of said troughs, said plates being provided with sockets for mounting the tubular fluorescent lamps, and electrical leads from said sockets connected by flexible wires to pin electrical connectors.

6. A patterned tubular fluorescent light fixture assembly for ceiling mounting comprising in combination pluralities of fluorescent tube housing units, ballast housing units, and suspension support units, said units being interconnected electrically and mechanically to form long parallel rows of lightable fluorescent tube housing units and intermediate unlightable cross rows of ballast housing units, the adjoining ends of certain of said fluorescent tube housing units disposed adjacent the ends of said ballast units being separably connected mechanically and electrically to said suspension support units and the ends of certain other fluorescent tube housing units disposed adjacent the middle portion of said ballast units being separably connected mechanically and electrically to said middle portion of said ballast units; and the ends of said ballast housing units being separably connected mechanically and electrically to said suspension support units; the other ends of said adjacent fluorescent tube housing units being separably connected electrically and mechanically in end-to-end relation to other fluorescent tube housing units forming said long parallel rows of lightable housings; and hanger rods attached to the adjoined ends of said other tube housings for attachment to the ceiling; each of said suspension support units comprising a support channel having inturned flanges, the open ends of said channel being disposed to face the ends of said ballast housing units and to form a sleeve joint therewith, with a closure plate disposed under said inturned flanges, said closure plate being operatively attached to a hollow support tube adapted to be suspended from the ceiling and to conceal electric supply wires; said support channel being provided at the sides with screw tabs arranged to engage the ends of adjoining fluorescent tube housing units for connection thereto, an electrical connector block electrically connected to electric supply wires carried to said channel member by said hollow tube, said connector block being adapted to receive pin connector plugs from said lamp housing units and said ballast housing units; and a separable snap-on cover member arranged below said channel member and adapted to conceal said connector block and said pin connectors; each of said ballast housing units comprising a structural channel having inturned flanges defining its upper surface, a sheet metal channel coupler extending from the ends of said structural channel, said coupler being adapted to telescope into the open ends of said suspension support unit, an electrical ballast member mounted within said structural channel, and pin electrical connectors with wire leads electrically connected to said ballast member; and each of said fluorescent tube units comprising a trough-like structure partly surrounding tubular lights, with end plates at the ends of said troughs, said plates being provided with sockets for mounting the tubular fluorescent lamps, and electrical leads from said sockets connected by flexible wires to pin electrical connectors.

References Cited in the file of this patent

UNITED STATES PATENTS

| | | |
|---|---|---|
| 2,288,941 | Curtis | July 7, 1942 |
| 2,625,646 | Goebel | Jan. 13, 1953 |
| 2,759,093 | Ferar et al. | Aug. 14, 1956 |
| 2,807,709 | Guth | Sept. 24, 1957 |
| 2,818,497 | Alden | Dec. 31, 1957 |
| 2,887,567 | Dameral | May 19, 1959 |
| 2,918,567 | Leitz | Dec. 22, 1959 |

OTHER REFERENCES

"Fluorescent Lamp Fixtures," Bulletin No. 95, May 20, 1939, page 3, published by Overbagh & Ayres Mfg. Co., Chicago, Ill.